United States Patent [19]
Mehta et al.

[11] Patent Number: 5,689,261
[45] Date of Patent: Nov. 18, 1997

[54] REMOTE CONTROL SYSTEM FOR CEILING FAN AND LIGHT

[75] Inventors: Vinay Mehta, Germantown; Robert E. Beasley, Jr., Memphis, both of Tenn.

[73] Assignee: Hunter Fan Company, Memphis, Tenn.

[21] Appl. No.: 593,472

[22] Filed: Jan. 29, 1996

Related U.S. Application Data

[63] Continuation of Ser. No. 273,964, Jul. 12, 1994, abandoned.
[51] Int. Cl.$^6$ ............................................. G08C 19/12
[52] U.S. Cl. ............ 341/173; 341/173; 340/310.01; 340/310.02; 340/825.72
[58] Field of Search .................. 341/173; 340/825.22, 340/825.57, 825.62, 825.69, 825.72, 310.01, 310.02; 307/114–115

[56] References Cited

U.S. PATENT DOCUMENTS

| | | | |
|---|---|---|---|
| 4,322,632 | 3/1982 | Hart | 307/41 |
| 4,371,814 | 2/1983 | Hannas | 318/16 |
| 4,538,973 | 9/1985 | Angott | 417/572 |
| 4,716,409 | 12/1987 | Hart et al. | 340/825 |
| 4,719,446 | 1/1988 | Hart | 340/310.01 |
| 4,818,920 | 4/1989 | Jacob | 340/825.57 |
| 5,041,825 | 8/1991 | Hart et al. | 340/825 |
| 5,163,112 | 11/1992 | Lefevre et al. | 385/19 |
| 5,187,472 | 2/1993 | Hart et al. | 340/825 |
| 5,189,412 | 2/1993 | Mehta et al. | 340/825 |

*Primary Examiner*—Thomas Mullen
*Assistant Examiner*—Ashok Mannara
*Attorney, Agent, or Firm*—Baker & Botts, L.L.P.

[57] ABSTRACT

An RF remote control system for operating a ceiling fan and its light is disclosed. The remote control system comprises a receiver and two remote controllers, each having different operating characteristics. The remote controllers use radio frequency (RF) transmission to send control signals to the receiver. The receiver utilizes a microprocessor to process the control signals from the remote controllers and to operate the ceiling fan and its light. The receiver also includes a power interruption feature, which allows the operation of the ceiling fan light without the use of the remote controllers.

5 Claims, 5 Drawing Sheets

REMOTE CONTROL SYSTEM FOR CEILING FAN AND LIGHT

This is a continuation of application Ser. No. 08/273,964 filed on Jul. 12, 1994 now abandoned.

FIELD OF INVENTION

This invention relates in general to ceiling fans and, more particularly, to a remote control system for operating a ceiling fan and its light.

BACKGROUND OF THE INVENTION

Ceiling fans are typically mounted on the ceiling of a room for circulating the air in the room. Many ceiling fans have lights attached thereto for illuminating the room. Ceiling fans are typically connected to a 120 volt household power source via a wall-mounted on/off switch. The on/off switch provides a means for operating the ceiling fan and light. Another common means for operating the ceiling fan is via switches located on the ceiling fan. These switches are usually chain operated and can turn on and off the ceiling fan and the light and can further control the speed and direction of the ceiling fan and the illumination level of the light. In addition, the ceiling fan may be operated via wall-mounted switches and other switching means known in the art.

In addition to switches, ceiling fans may be operated remotely using radio frequency (RF) control systems. For example, U.S. Pat. No. 5,041,825, issued to Edward F. Hart and William B. McDonough, discloses the use of an RF remote control system for operating a ceiling fan. The remote control system comprises a remote controller and a receiver mounted in the ceiling fan. In the art, RF remote control systems may operate various aspects of the ceiling fan and its light. For example, a remote controller may (1) turn the ceiling fan on and off and control the fan rotational speed; (2) turn the ceiling fan light on and off and control the light illumination level; (3) reverse the fan rotational direction; and (4) activate other fan and light functions. In the art, if multiple remote controllers are desired for operating a ceiling fan, identical remote controllers are provided. See, e.g., U.S. Pat. No. 5,041,825, FIG. 2 and column 3, lines 25–35. In certain applications, however, it may be desirable to have two remote controllers wherein each controller has different control characteristics. For example, for a ceiling fan and light mounted in a bedroom, two remote controllers having different control characteristics may be desirable. In such an application, one remote controller may be wall mounted near the on/off switch for the ceiling fan, and the other remote controller may be placed near the bed. As a person enters the bedroom, she may press the light button on the wall-mounted remote controller to turn on the ceiling fan light at its previous illumination level as stored in the memory of the remote control system. She may then further adjust the illumination level by depressing and holding the light button. Upon exiting the bedroom, she may depress again the light button of the wall-mounted controller to turn off the light. The current light setting may be saved in the system's memory for later use. In addition to the wall-mounted controller, she may use the bedside controller to operate the ceiling fan and light. For instance, when she wakes up during the middle of the night, she may turn on the ceiling fan light by depressing the light button on the bedside controller. The light will turn on at the lowest (or any preset) illumination level to avoid straining her eyes. She may then adjust the illumination level by depressing and holding the light button. When she no longer needs the light, she may turn off the light by depressing the light button once again. The light setting, however, would not be saved in the system's memory. The above situation illustrates one instance where it is desirable to have a control system having two remote controllers with different control characteristics for operating the ceiling fan light. There are other situations where it may be desirable to have multiple controllers with different control characteristics. Therefore, a need has arisen for providing a remote control system having two remote controllers, each having different control characteristics for operating a ceiling fan and its light.

SUMMARY OF THE INVENTION

It is an object of this invention to provide two remote controllers, each having different control functions, for operating a ceiling fan and light.

It is another object of this invention to provide a means for operating the ceiling fan light without the use of the remote controllers.

It is yet another object of this invention to use a programmable microprocessor with internal memory to control the operation of the ceiling fan and light.

In accordance with the present invention, an RF remote control system for operating a ceiling fan and its light is provided. The remote control system comprises a receiver and two remote controllers. The receiver is electrically connected to a household electrical power supply of 120 volts. The power supply is connected to the receiver via an on/off switch, preferably mounted on the wall of a room where the ceiling fan is located. The receiver is also electrically connected to the ceiling fan and light to provide power to and control of the ceiling fan and its light. The receiver may be mounted in the ceiling fan's motor housing, switch housing, or canopy assembly. The receiver has means for receiving RF transmission of control signals from the two remote controllers. The receiver utilizes a programmable microprocessor with memory to operate the ceiling fan and the light.

The remote controllers have buttons to operate the ceiling fan and light. Preferably, each remote controller has a fan button for turning on/off and adjusting the rotational speed of the ceiling fan and a light button for turning on/off and adjusting the illumination level of the light. In addition, the remote controllers may include additional control functions such as time delayed fan speed, auto reverse, and delayed light off. The remote controllers use RF transmission to send control signals to the receiver. In a preferred embodiment, by depressing the fan or light button once, the remote controllers will send control signals to the receiver to turn on and off the ceiling fan or light, respectively. By depressing and holding the fan or light button, the controllers will send control signals to the receiver to control the speed of the ceiling fan or the illumination level of the light, respectively. However, in a preferred embodiment, the two remote controllers are not identical in their control of the operation of the ceiling fan light. Through the use of the microprocessor and its associated memory for storing previous light settings, the present remote control system allows the two remote controllers to operate the ceiling fan light in different manners. In particular, by depressing the light button of the first remote controller, the light is mined on at the previous light setting, which is stored in the memory of the receiver. On the other hand, by depressing the light button of the second remote controller, the light is mined on at the lowest (or preset) illumination level. When the light button is depressed again, the first controller operates to turn off the light and the illumination level is saved in the memory of the microprocessor, whereas the second controllers also operates to turn off the light, but the light setting will not be saved in the memory of the microprocessor. In a preferred embodiment, the operation sequence of the ceiling fan is alike for both remote controllers.

Both remote controllers may operate from any location within their RF range. Preferably, the RF range of the remote controllers is sufficiently broad to cover a typical room where the ceiling fan is located. The first remote controller may be mounted on the wall of the room near the on/off switch for the ceiling fan, and the second controller may be portably located near the occupant in the room. In a preferred embodiment, the ceiling fan is mounted in a bedroom; the first remote controller is mounted on the wall near the on/off switch for the ceiling fan, and the second remote controller is located at bedside for convenient use by the occupant while lying in bed.

In addition, the receiver includes a power interruption feature that allows a person to turn on the ceiling fan light without the use of the remote controllers. By flipping the on/off switch on and off twice in 5 seconds (thus interrupting the power supply to the receiver), the ceiling fan light will turn on if: (1) the light was previously turned off for more than one minute before the power interruption sequence, and (2) power has been available to the receiver for more than one minute before the power interruption sequence. This feature provides a means for a user to turn on the light when the remote controllers are unavailable.

DETAILED DESCRIPTION OF THE INVENTION

Figure 1:
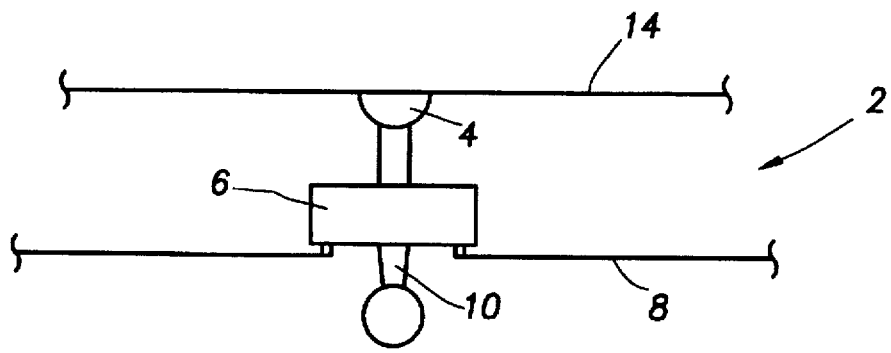
FIG. 1 is a side view of a ceiling fan and its light.
Figure 2:
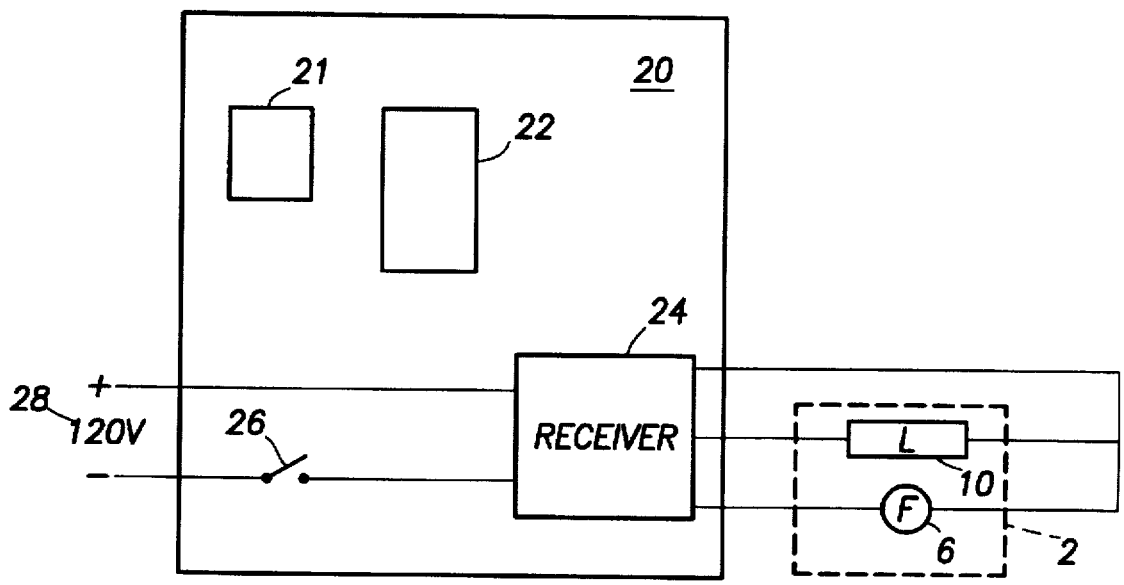
FIG. 2 is a block diagram of a remote control system connected to the ceiling fan and light shown in FIG. 1 in accordance with a preferred embodiment of the present invention.

FIG. 1 illustrates a prior art ceiling fan assembly 2 comprising a ceiling mount 4 or canopy, an electric motor 6, a plurality of fan blades 8, and a light fixture 10. The ceiling fan 2 is typically mounted on the ceiling 14 of a room (not shown). FIG. 2 illustrates a remote control system 20 for operating the ceiling fan assembly 2 in accordance with a preferred embodiment of the present invention. The remote control system 20 comprises a first remote controller 21, a second remote controller 22, which operates the ceiling fan differently from the first remote controller 21, and a receiver 24. The remote controllers 21, 22 use radio-frequency (RF) transmission to send control signals to the receiver 24. The receiver 24 is electrically connected, via an on/off switch 26, to a household power source 28 of 120 volts. The receiver 24 is also electrically connected to the ceiling fan assembly 2. The receiver 24 receives control signals from the remote controllers 21, 22 and operates the ceiling fan assembly 2 by regulating the amount of electrical power supplied to the ceiling fan motor 6 and light 10.

Figure 3:
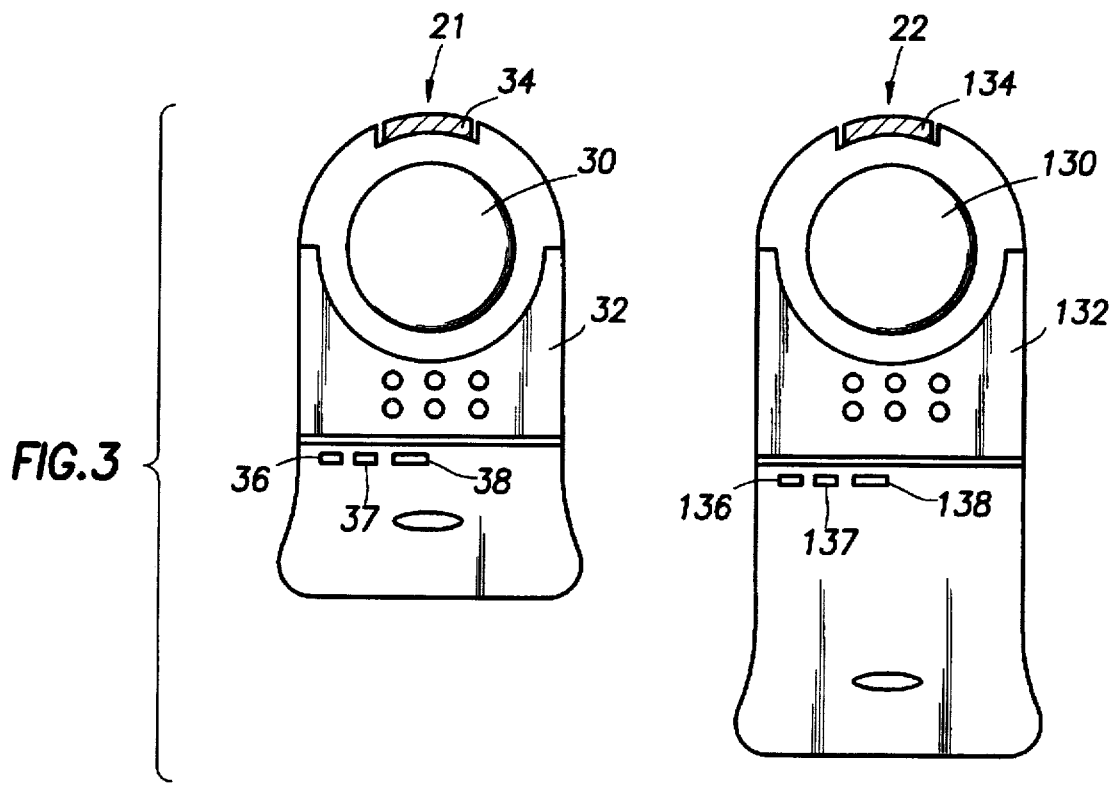
FIG. 3 is a frontal view of two remote controllers showing control buttons.

FIG. 3 illustrates the shape and appearance of the two remote controllers 21, 22 in accordance with a preferred embodiment of the present invention. The first remote controller 21 may be wall mounted; the second remote controller 22 is physically larger in comparison with the first controller 21 and may be hand held and used as a bedside controller. In other embodiments, the shape, appearance, and physical placement of the remote controllers 21, 22 may vary according to specific needs. The first and second remote controllers 21, 22 have a plurality of control buttons, including a light button 30, 130, a fan button 32, 132, and a reverse-fan-direction button 34, 134, respectively. The remote controllers 21, 22 may further include optional function buttons 36, 136, 37, 137, 38, 138 to control such functions such time-delayed fan off, auto-reverse, and time-delayed light off, as discussed below in Table 1. These and other optional function buttons may be added or deleted from one or both remote controllers 21, 22 in accordance with the desired control functions and features.

Although the remote controllers 21, 22 may have similar control buttons, the remote controllers 21, 22 control the ceiling fan assembly 2 differently. In particular, in a preferred embodiment, the remote controllers 21, 22 operate the ceiling fan light 10 differently, as described in Table 1 below:

TABLE 1

| CONTROLLER STEP BUTTON | | FIRST REMOTE CONTROLLER'S OPERATIONAL CHARACTERISTICS | SECOND REMOTE CONTROLLER'S OPERATIONAL CHARACTERISTICS |
|---|---|---|---|
| 1 | Press light button once. | Turns on the light at the previous setting, which is stored in the receiver's memory. The previous setting is the light illumination level before the light was turned off | Turns on the light at the lowest light illumination level or at a preset (or default) level. |
| 2 | Press light button once again. | Turns off the light. The light setting is stored in the receiver's memory. | Turns off the light. The light setting is not stored in the receiver's memory. |
| 3 | Press light button again. | Same as Step 1. | Same as Step 1. |
| 4 | Press and hold light button. | Changes light illumination level from the current level towards higher levels in incremental steps. | Changes light illumination level from the current level towards higher levels in incremental steps. |
| 5 | Press fan button once. | Turns on fan at high speed. | Turns on fan at high speed. |
| 6 | Press and hold fan button. | Changes fan speed in sequence from high to medium to low. | Changes fan speed in sequence from high to medium to low. |
| 7 | Press fan button once | Turns fan off. | Turns fan off. |

TABLE 1-continued

| CONTROLLER STEP BUTTON | FIRST REMOTE CONTROLLER'S OPERATIONAL CHARACTERISTICS | SECOND REMOTE CONTROLLER'S OPERATIONAL CHARACTERISTICS |
| --- | --- | --- |
| | more. | |
| 8  Press fan reverse button. | Changes the fan's rotational direction. | Changes the fan's rotational direction. |
| 9  Press time-delayed fan off button. | Changes the fan speed automatically as follows:<br>A. 4 hours at current speed;<br>B. Next two hours, set to next lower speed;<br>C. Next two hours, set to next lower speed; and<br>D. Turn fan off | Changes the fan speed automatically as follows:<br>A. 4 hours at current speed;<br>B. Next two hours, set to next lower speed;<br>C. Next two hours, set to next lower speed; and<br>D. Turn fan off |
| 10  Press auto-reverse button. | Changes the fan speed automatically as follows:<br>A. 4 hours at current speed and direction;<br>B. Next 4 hours at current speed, but reverse the fan rotational direction; and<br>C. Turn fan off | Changes the fan speed automatically as follows:<br>A. 4 hours at current speed and direction;<br>B. Next 4 hours at current speed, but reverse the fan rotational direction<br>C. Turn fan off |
| 11  Press time-delayed light off button. | Light remains on (or off if it was off) for one minute and then it is turned off. | Light remains on (or off if it was off) for one minute and then it is turned off. |

Note that in the preferred embodiment, as described in Table 1, the remote controllers 21, 22 operate the ceiling fan motor 6 in the same manner. In other embodiments, however, the remote controllers 21, 22 may operate the ceiling fan motor 6 and other functions differently.

Figure 3A:
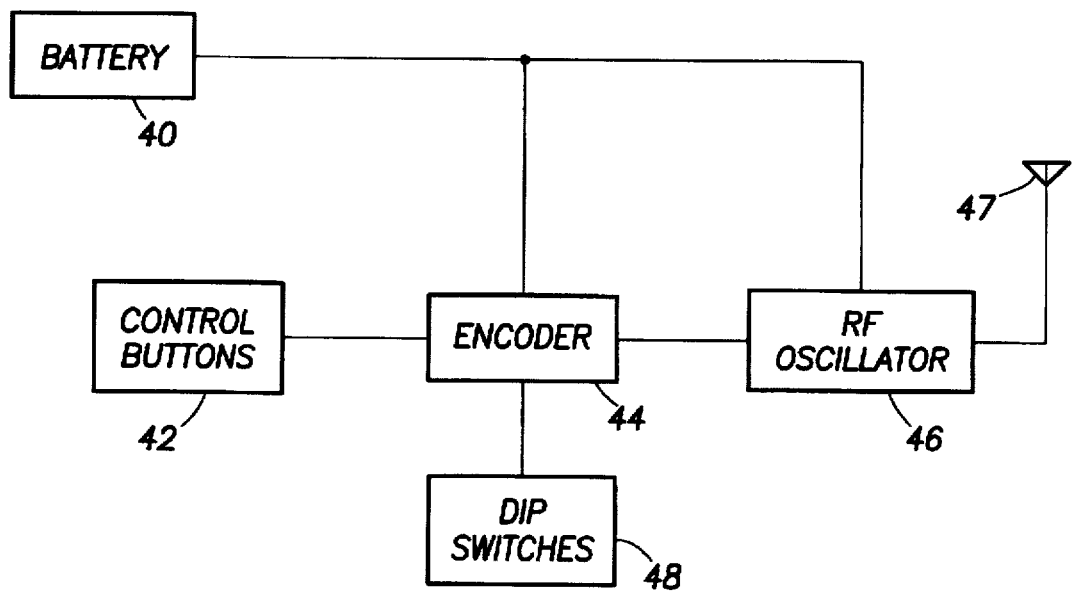
FIG. 3a is a block diagram of the main components of the remote controllers illustrated in FIG. 3.

FIG. 3a is a block diagram of the main electronic components of the first and second remote controllers 21, 22, including a battery 40, a plurality of control buttons 42, an encoder 44, an RF oscillator 46, and a set of dip switches 48. The remote controllers 21, 22 are powered by the battery 40, preferably a 9 volt standard size battery. The dip switches 48 allow for the selection of a unique digital pattern, which is commonly referred to as the "house code", for encoding with the control signals of each remote controller 21, 22. In the preferred embodiment, the set of dip switches 48 comprises four individual dip switches. Each dip switch has two positions: 1 and 0 (corresponding to an "on" or "off" setting). With four dip switches, sixteen different house codes may be set. For the proper operation of the remote control system 20, the dip switches 48 in both remote controllers 21, 22 and the dip switches 54 (not shown; see FIG. 4) in the receiver 24, must be set the same, i.e., set to the same house code. Moreover, if multiple remote control systems using the same RF frequency are operating within the RF range of each other, each system must use a unique house code to avoid interfering with each other. By setting a unique house code, each remote control system will use a different set of coded signals to communication, thereby insuring that only the receiver 20 for that system will respond to those control signals matching the house code setting in the remote controllers 21, 22.

During operation, when a user depresses a control button, a 10-bit length digital code comprising (1) the house code for the system 20, (2) a remote controller identifier code, and (3) the control code corresponding to the depressed control button is digitally encoded by the encoder 44 for RF transmission. Preferably, within the 10-bit digital code, the house code occupies bit positions 0 to 3, the remote controller identifier code uses the 4th bit position to represent the first or second remote controller, and the control functions occupy bit positions 5 to 9, wherein each control function has a unique bit position. The encoded control signal is input to the oscillator 48 for RF transmission. The RF oscillator 48 preferably generates a carrier frequency of 310 MHz. The encoded control signal is superimposed on the carrier signal and transmitted to the receiver 24.

Figure 4:
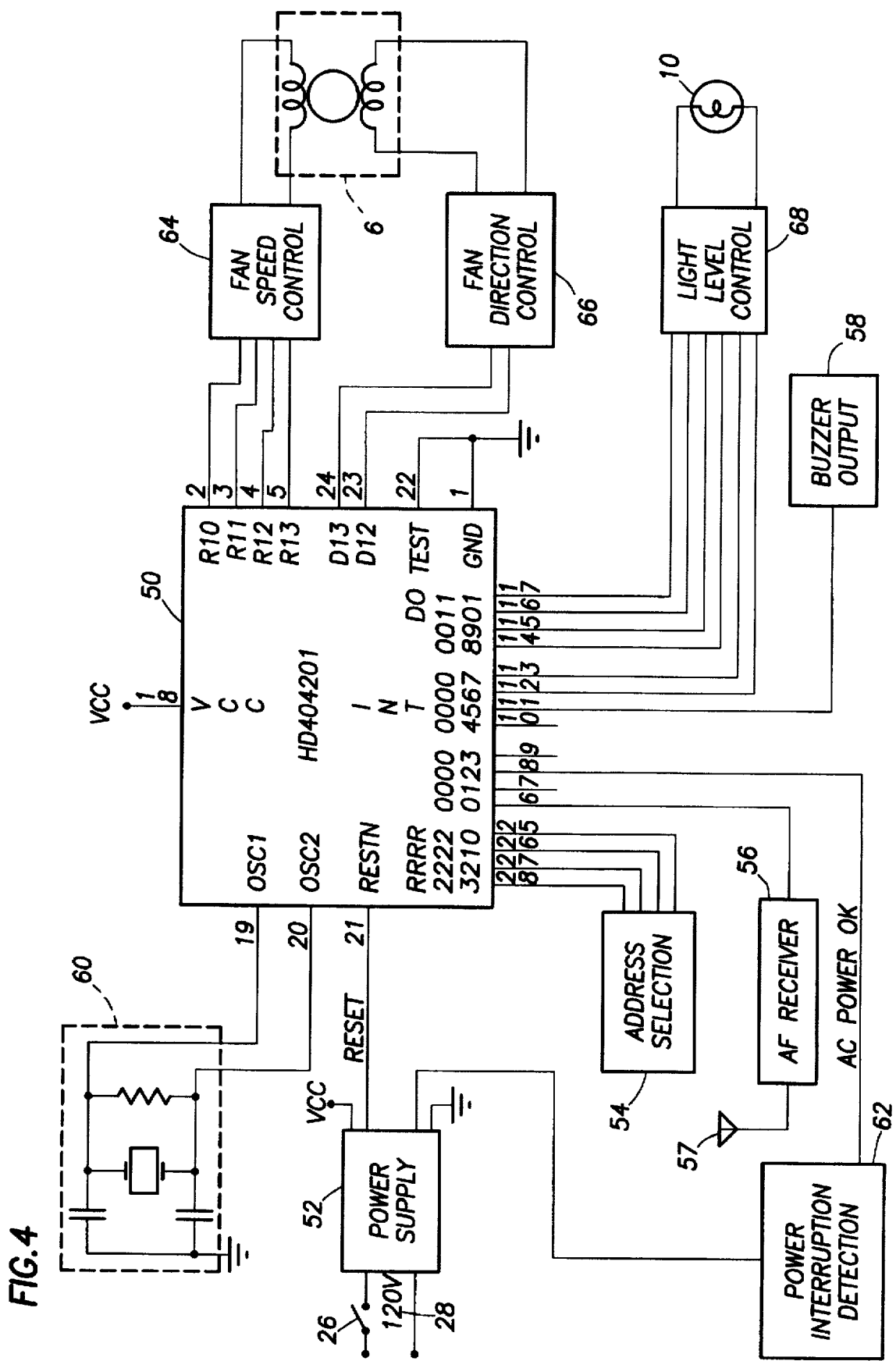
FIG. 4 is a schematic diagram of the receiver of the remote control system illustrated in FIG. 2.

FIG. 4 is a schematic diagram of the receiver 24 according to a preferred embodiment of the present invention. The receiver 24 utilizes a microprocessor 50 for controlling the ceiling fan 6 and light 10. The microprocessor 50 has built-in signal decoder for decoding the RF signal from the remote controllers 21, 22. The microprocessor 50 is connected to the following components: a low-voltage power supply Vcc; an output of a power supply 52, which is connected to a household power source of 120 volts via an on/off wall switch 26 and supplies power to the ceiling fan 6 and light 10; a set of dip switches 54 for selecting house code; a RF receiver 56 connected to an antenna 57 for receiving RF transmission of control signals from the remote controllers 21, 22; a buzzer 58 that signals to the user of the receipt of a control signal from the remote controllers 21, 22 by the receiver 24; a crystal clock circuit 60 for providing timing to the microprocessor 50; and a power interruption detection circuit 62, which is connected to an output of the power supply 52, for detecting power interruptions to the power supply 52.

The microprocessor 50 controls the ceiling fan 6 and light 10 via the following circuits: a fan speed control circuit 64 that controls the speed of the ceiling fan 2 by using, for example, triacs and capacitors (not shown) to regulate the amount of power provided to the ceiling fan motor 6; a fan directional control circuit 66 that controls the direction of the fan rotation by using a reversing relay to change the polarity of the motor winding of the ceiling fan motor 6; and a light level control circuit 68 that controls the illumination level of the ceiling fan light 10 by using, for example, a triac driver (not shown) to vary the amount of power supplied to the light 10. The fan speed control circuit 64 and the light level control circuit 68 receive digital control signals from the microprocessor 50 and convert the digital signals into their equivalent analog voltage. The level of the analog voltages determines the rotational speed of the ceiling fan 6 and the illumination level of the light 10.

Figure 5A:
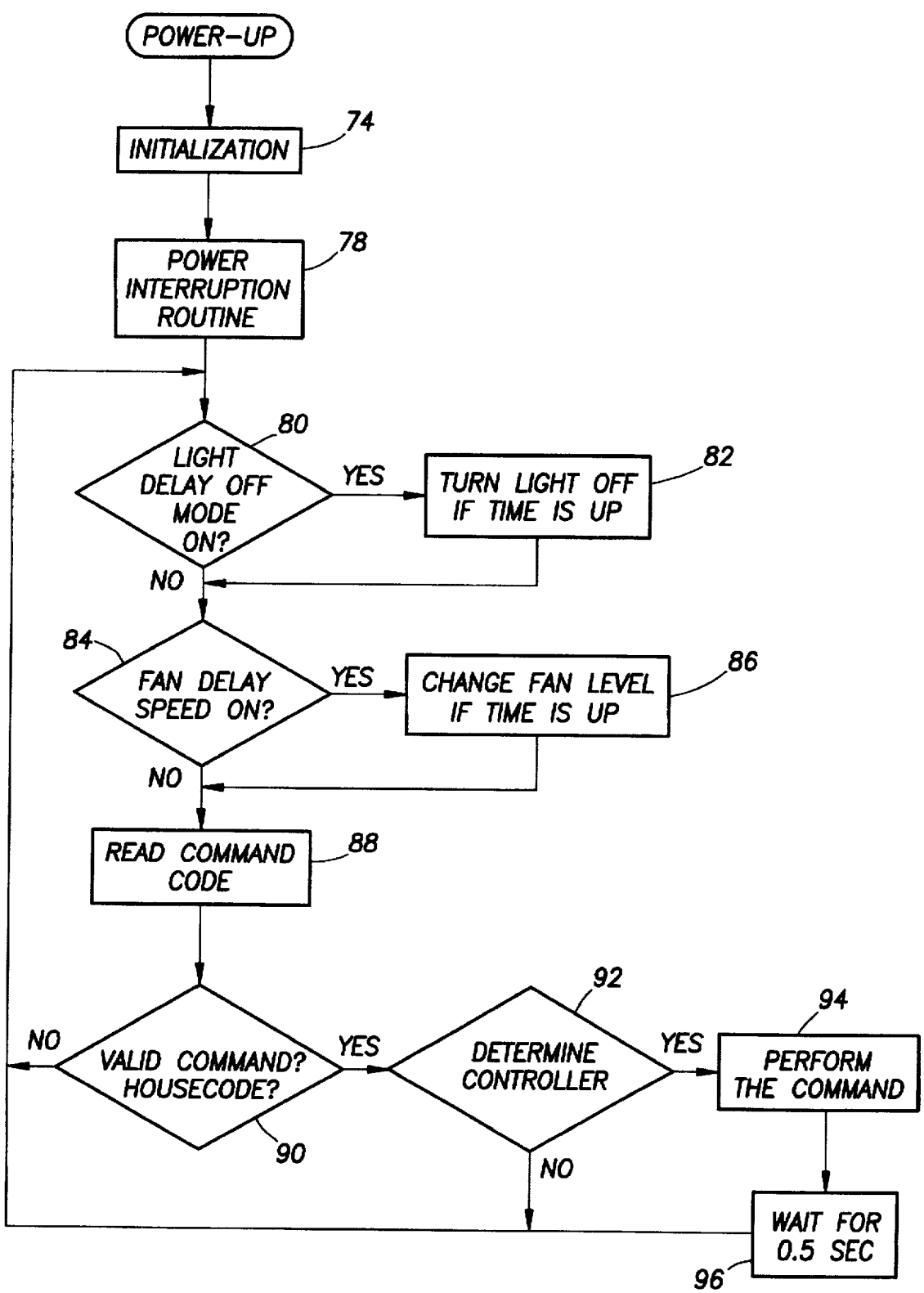
FIG. 5a is a flow chart of the control sequence implemented in the receiver illustrated in FIG. 4.

FIG. 5a is a flow chart showing the operation of microprocessor 50 in the receiver 24 in accordance with a preferred embodiment of the present invention. The microprocessor 50 is software driven and its timing is regulated by the crystal clock 60 (shown in FIG. 4). In general, the microprocessor 50 controls the fan 6 and light 10 operation and constantly monitors for incoming RF signals from the remote controllers 20, 21. Referring to FIG. 5a, when the receiver 24 is first powered up by 120 V line, the microprocessor 50 goes through an initialization step 74, wherein the microprocessor 50 initializes its internal registers and sets the house code for the system 20 by reading the settings of the dip switches 54 (shown in FIG. 4). Once the house code is determined, the microprocessor 50 will respond only to incoming control signals corresponding to that house code. Next, the microprocessor 50 executes a power interruption routine 78 by clearing its central memory, typically RAM, loading in the interruption conditions and characteristics, and executing the power interruption program in the permanent memory, typically ROM, of the microprocessor 50. The power interruption routine 78 allows the user to operate the ceiling fan 6 and light 10 without the use of the remote controllers 21, 22 when the following conditions are met: referring to FIG. 2, first, the on/off wall switch 26 must be flipped twice within five seconds to interrupt power to the receiver 24; second, power has been available to the receiver 24 for more than one minute; and, third, the light 10 was previously off for more than one minute prior to the power interruptions. These conditions prevent unnecessary triggering of the light 10 by random momentary interruptions from the power company or sudden voltage drops due to heavy loading on the power line, e.g., when an air conditioner compressor starts. Without these conditions and if the receiver 24 is designed to turn on the light 10 by a simple interruption of power, then the receiver 24 would turn on the light 10 whenever there is a sudden drop in the voltage or interruption to the power supply.

The following example illustrates how these conditions are applied to a common real world situation. Assume that electrical power is available to the receiver 24 and that the light 10 has been off for several hours. Suddenly, there are power interruptions in the power supply due to a thunderstorm. The first interruption occurs at midnight; the second interruptions occurs 20 seconds after midnight; the third interruption occurs 22 seconds after midnight, the fourth interruption occurs 50 seconds after midnight. When the first interruption occurs at midnight, the light 10 will not turn on because the first condition is not met, i.e., there was only one interruption in 5 seconds. When the next two interruptions occur at 20 and 22 seconds after midnight, meeting condition one because they are within a 5 second interval, the light 10 still will not turn on because of condition two, which requires that power be available to the receiver for more than one minute before the power interruption. In this example, however, power was interrupted at midnight which occurred 20 seconds earlier; therefore, the light 10 will not turn on, notwithstanding that two power interruptions occurred within 5 seconds. On the other hand, in a normal case, where the electrical power would be available to the receiver 24 for more than one minute and the light 10 has been off for more than one minute, when a person walks in the room and flips the switch 26 twice, the light 10 will turn on since the light 10 was off for more than one minute and power has been available to the receiver for more than one minute before the power interruptions by the switch 26. While the application of these conditions will not eliminate all false triggering, it should eliminate the most common occurrences.

Figure 5B:
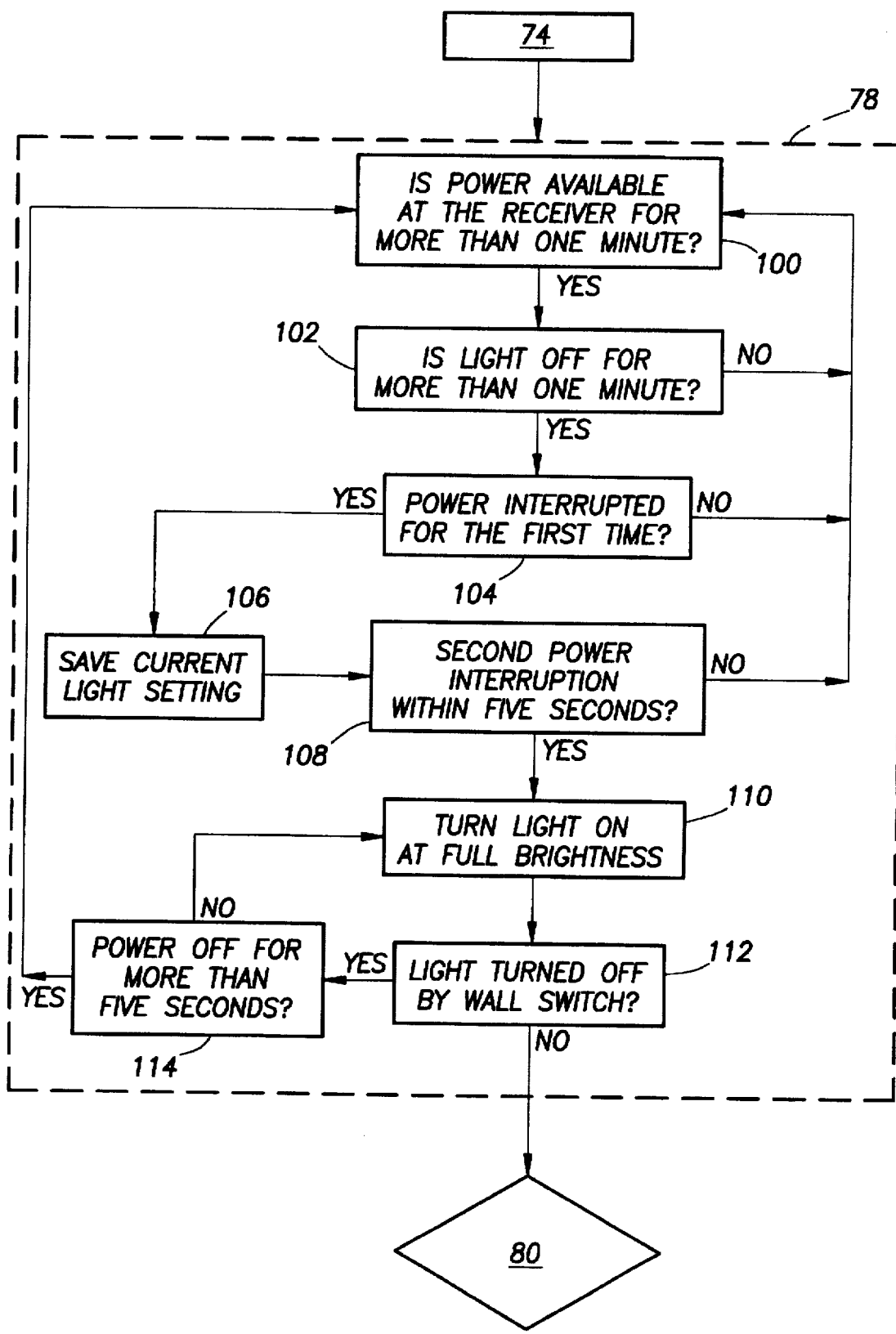
FIG. 5b is a flow chart of the power interruption routine used in the receiver illustrated in FIG. 4.

Referring to FIG. 5b, which illustrates the logic flow within the power interruption routine 78, in step 100 the microprocessor 50 determines whether electrical power has been available to the receiver 24 for more than one minute. If not, the microprocessor waits until power has been available for more than one minute. Next, the microprocessor 50 proceeds to step 102 to determine whether the ceiling fan light 10 has been off for more than one minute. If not, the microprocessor 50 returns to step 100. If the light 10 was on for more than one minute, the microprocessor 50 determines whether this is the first power interruption in step 104. If not, the microprocessor 50 returns to step 100 and repeat. If this is the first interruption in the last five seconds, the microprocessor proceeds to step 106 and saves the memory setting for the light 10, which is the setting of the light 10 prior to this power interruption, and waits for the second power interruption. In step 108, if the second power interruption occurs within five seconds, the microprocessor 50 proceeds to step 110 and turns on the ceiling fan light 10 to full illumination level. In step 112, if the wall switch 26 is momentarily turned off and turned on again, in less than 5 seconds, then the microprocessor 50 will ignore the power interruption and allow the light 10 to stay on. This feature is particularly important, because if the light 10 is on and there is a sudden power interruption, the light 10 will not turn off and will remain on at its current setting. However, if the power is off for more than 5 seconds, then the microprocessor 50 will repeat the power interruption routine 78. The predetermined time intervals used in the power interruption routine represent one embodiment of the present invention. Different time intervals may be used depending on the power interruption pattern in a particular area.

Upon execution of the power interruption routine 80, the microprocessor 50 proceeds to the process incoming control signals. Referring to FIG. 5a, the microprocessor 50 processes control signals by repeatedly executing in a loop fashion. In step 80, the microprocessor 50 determines whether the light delayed-off mode is set. If so, in step 82, the microprocessor 50 performs the light delayed-off function by turning off the light 10 when the set timer expires. If light delayed-off mode is not set, the microprocessor 10 proceeds to step 84 to determine whether the fan delayed-speed mode is set. If set, in step 86, the microprocessor 50 will change the fan rotational speed at the selected times. Next, in step 88, the microprocessor 50 waits for a control signal for the remote controllers 21, 22. If there is a control signal, in step 90, the microprocessor 50 will determine whether the control signal is a valid control command and whether the house code is correct. If not valid, the microprocessor 50 will go to step 80 and repeat. If valid, the microprocessor 50 will process the control signals to determine which fan or light operation to perform. In step 92, to determine which remote controller 21, 22 sent the control signal, the microprocessor 50 examines the control signal for the controller identifier code. Depending on the remote controller 21, 22 and the type of control signal received, in step 94, the microprocessor 50 selects the appropriate action by comparing the control code with a look-up table in the microprocessor 50. After the desired function has been performed, in step 96, the microprocessor 50 will wait one half second and then loop again to step 80.

The present invention has been described in detail in connection with a preferred embodiment. This embodiment, however, is merely one example and the invention is not restricted thereto. It will be understood by those skilled in the art that other variations and modifications can be easily made within the scope of the invention as defined by the appended claims.

What is claimed is:

1. A remote control system for operating a ceiling fan assembly adapted to be connected to a power supply and having a ceiling fan motor and light, said system comprising:

an RF receiver;

a fan speed control having an output electrically connected to the ceiling fan motor and having an input electrically connected to the RF receiver;

a light level control having an output electrically connected to the light and having an input electrically connected to the RF receiver, the light level control able to operate the light at a range of power levels ranging from a highest power level to a lowest power level;

a first remote controller having a first plurality of control buttons each of which, when depressed, initiates a corresponding one of a first set of control signals for setting power levels, said first remote controller having a first RF transmitting means for sending the first set of control signals to said receiver;

a second remote controller having a second plurality of control buttons each of which, when depressed, initiates a corresponding one of a second set of control signals for setting power levels, said second remote controller having a second RF transmitting means for sending the second set of control signals to said receiver; and wherein the first set of control signals and the second set of control signals are different and said RF receiver operates the fan speed control and the light level control in response to the first and second sets of control signals, wherein the light level control is operable to turn the light from an OFF state to an ON state at a previous power level in response to the first set of control signals, and wherein the light level control is operable to turn the light from an OFF state to an ON state at a preset power level in response to the second set of control signals, such that the light level control is operated differently according to whether a control signal is received from the first remote controller or the second remote controller.

2. The remote control system of claim 1, wherein the preset power level is the lowest power level.

3. The remote control system of claim 1 wherein the RF receiver includes a memory means for storing previous power level settings of the ceiling fan and light.

4. A remote control system for operating a ceiling fan assembly adapted to connected to a power supply and having a ceiling fan motor and light, said system comprising:

a receiver electrically connected to the power supply via an on/off switch, said receiver having an RF receiving means, a programmable microprocessor for setting a plurality of power levels to be applied to the ceiling fan motor and light, memory in the programmable microprocessor to store previous power level settings that were applied to the ceiling fan motor and light;

a fan speed control having an input electrically connected to the receiver and having an output electrically connected to the ceiling fan motor;

a light level control having an input electrically connected to the receiver and having an output electrically connected to the light, the light level control able to operate the light at a range of power levels ranging from a highest power level to a lowest power level;

a first remote controller having (1) a fan motor control button which when depressed initiates a first control signal for setting the fan speed control to one of a plurality of power levels to be applied to the ceiling fan motor and (2) a light control button which when depressed initiates a second control signal for setting the light level control to one of a plurality of power levels in the range of power levels to be applied to the light, said first remote controller having a first RF transmitter for sending the first and second control signals to said receiver;

a second remote controller having (1) a fan motor control button which when depressed initiates a third control signal for setting the fan speed control to one of the plurality of power levels to be applied to the ceiling fan motor and (2) a light control button which when depressed initiates a fourth control signal for setting the light level control to one of the plurality of power levels to be applied to the light, said second remote controller having a second RF transmitter for sending the third and fourth control signals to said receiver; and wherein the second control signal and the fourth control signal are different and the receiver operates the ceiling fan control and light level control in response to the first, second, third, and fourth control signals, wherein the light level control is operable to turn the light from an OFF state to an ON state at a stored previous power level in response to the second control signal, and wherein the light level control is operable to turn the light from an OFF state to an ON state at a preset power level in response to the fourth control signal, such that the light level control is operated differently according to whether a control signal is received from the first remote controller or the second remote controller.

5. The remote control system of claim 4, wherein the preset power level is the lowest power level.

\* \* \* \* \*

UNITED STATES PATENT AND TRADEMARK OFFICE
CERTIFICATE OF CORRECTION

PATENT NO. : 5,689,261
DATED : November 18, 1997
INVENTOR : Vinay Mehta
 Robert E. Beasley, Jr.

It is certified that error appears in the above-identified patent and that said Letters Patent is hereby corrected as shown below:

In claim 1, column 9, line 32, please replace "0N" with "ON".

Signed and Sealed this

Third Day of February, 1998

*Attest:*

BRUCE LEHMAN

*Attesting Officer*   *Commissioner of Patents and Trademarks*